US010524627B1

(12) United States Patent
Ebrahimi Afrouzi

(10) Patent No.: US 10,524,627 B1
(45) Date of Patent: Jan. 7, 2020

(54) METHOD FOR AUTOMATICALLY REMOVING OBSTRUCTIONS FROM ROBOTIC FLOOR-CLEANING DEVICES

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 172 days.

(21) Appl. No.: 15/792,119

(22) Filed: Oct. 24, 2017

Related U.S. Application Data

(60) Provisional application No. 62/404,331, filed on Oct. 5, 2016.

(51) Int. Cl.
| | | |
|---|---|---|
| *A47L 9/28* | (2006.01) | |
| *A47L 9/00* | (2006.01) | |
| *G06K 9/00* | (2006.01) | |
| *G06K 9/46* | (2006.01) | |
| *G06K 9/78* | (2006.01) | |
| *G06K 9/62* | (2006.01) | |
| *G05D 1/02* | (2006.01) | |

(52) U.S. Cl.
CPC ............ *A47L 9/2852* (2013.01); *A47L 9/009* (2013.01); *A47L 9/2805* (2013.01); *A47L 9/2884* (2013.01); *G05D 1/0238* (2013.01); *G06K 9/00805* (2013.01); *G06K 9/46* (2013.01); *G06K 9/6202* (2013.01); *G06K 9/6256* (2013.01); *G06K 9/78* (2013.01); *A47L 2201/04* (2013.01); *G06K 2209/21* (2013.01); *Y10S 901/01* (2013.01); *Y10S 901/47* (2013.01)

(58) Field of Classification Search
None
See application file for complete search history.

(56) References Cited

U.S. PATENT DOCUMENTS

| | | | |
|---|---|---|---|
| 6,076,226 A | 6/2000 | Reed | |
| 6,605,156 B1 | 8/2003 | Clark et al. | |
| 7,761,954 B2 | 7/2010 | Ziegler et al. | |
| 8,087,117 B2* | 1/2012 | Kapoor | A47L 9/106 15/52.1 |
| 8,515,578 B2* | 8/2013 | Chiappetta | G05D 1/0272 180/167 |
| 9,457,471 B2 | 10/2016 | Schnittman et al. | |
| 10,006,192 B2* | 6/2018 | Arnott | E03D 9/002 |
| 2008/0201897 A1* | 8/2008 | Nakai | A47L 9/0477 15/339 |
| 2010/0287717 A1* | 11/2010 | Jang | A47L 9/009 15/41.1 |
| 2015/0197012 A1 | 7/2015 | Schnittman et al. | |
| 2016/0345791 A1* | 12/2016 | Britain | A47L 9/2805 |
| 2017/0049289 A1* | 2/2017 | Ichikawa | A47L 9/04 |
| 2017/0080570 A1 | 3/2017 | Schnittman et al. | |
| 2018/0206686 A1* | 7/2018 | Shigeto | A47L 9/2847 |

* cited by examiner

*Primary Examiner* — Michelle M Entezari

(57) ABSTRACT

A method to automatically remove obstructions, such as electrical cords or wires, from robotic floor-cleaning devices after becoming entangled with wheels of the robotic device during operation. Upon sensing entanglement with an obstruction, the robotic floor-cleaning device is configured to retract one or more wheels into a wheel housing within the main housing of the robotic device. During retraction, the obstruction entangled around the one or more wheels is forcibly separated from the wheel by the corresponding wheel housing.

20 Claims, 5 Drawing Sheets

METHOD FOR AUTOMATICALLY REMOVING OBSTRUCTIONS FROM ROBOTIC FLOOR-CLEANING DEVICES

CROSS-REFERENCE TO RELATED APPLICATIONS

This application claims the benefit of provisional patent application Ser. No. 62/404,331, filed Oct. 5, 2016 by the present inventor.

FIELD OF INVENTION

The present invention relates to robotic floor-cleaning devices, and more particularly, to methods for automatically removing obstructions from robotic floor-cleaning devices.

BACKGROUND OF INVENTION

During operation, robotic floor-cleaning devices may encounter obstructions on work surfaces, which may become entangled in one or more wheels of the device, preventing the device from completing work. Several solutions have been proposed in prior art to detect wheel obstructions. For example, the amount of current generated by an individual wheel motor has been used to detect obstructions because the current generated in rotating a wheel increases when a wheel is obstructed. Once an obstruction is detected, the wheel is programmed to stop rotating and the robotic device reverses direction until the current is below a certain threshold, at which time the robotic device may resume operation. Sensors have also been used to detect entanglement with similar response of wheel reversal upon detection. This method may not be ideal as the robotic device is required to operate in the opposite direction for a period of time until the entanglement is removed which is inefficient and increases cleaning time. Furthermore, in certain cases, large obstacles may be drawn up by a wheel and lodged above it or an obstacle may become tightly wound around the wheel. In these situations, further jamming could occur wherein the wheel can neither operate normally in the forward nor reverse direction to remove the entangled obstacle. Generally, in prior art, the wheels are reversed to remove obstructions. A more precise and efficient method for removing an obstruction from a wheel is needed.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

It is a goal of the present invention to introduce a method to automatically remove obstructions on or around the wheels of a robotic floor-cleaning device. Such instances can occur when obstacles accessible by robotic devices, such as electrical cords or wires, are left exposed on a work surface and robotic devices encounter them during operation.

The present invention achieves the above stated goal by configuring a robotic floor-cleaning device to retract one or more wheels upon sensing an obstruction thereon. One or more wheels of the robotic floor-cleaning device where the obstruction(s) is (are) detected are retracted into a wheel housing within the main housing of the robotic device. During retraction of the wheel, any obstruction entangled around the one or more wheels is forcibly separated from the wheel by the wheel housing because only the wheel is capable of fitting within the housing.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As understood herein, the term "robot" or "robotic device" or "robotic floor-cleaning device" may be defined generally to include one or more autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

The present invention proposes a method to automatically remove obstacles entangled on or around wheels of robotic floor-cleaning devices. A robotic floor-cleaning device can have various methods for sensing a entanglements. For example, an odometer can be used to detect wheel rotation wherein slower than normal or lack of wheel rotation can indicate that a wheel is obstructed. Upon identifying that a wheel is obstructed, the robotic floor-cleaning device is configured to retract the wheel into a wheel housing within the main housing of the robotic device. During retraction, any items entangled around the one wheel is forcibly separated from the wheel by the wheel housing because only the wheel is capable of fitting within the housing. Extraneous obstacles or objects will be pushed aside by the wheel housing as the wheel is retracted. The wheel can then be returned to the normal position and the robotic floor-cleaning device can resume cleaning. In some embodiments, a robotic floor-cleaning device is able to identify the specific wheel where an obstruction is occurring. In such cases, only the specific wheel where the obstruction is identified as occurring is retracted.

Figure 1:
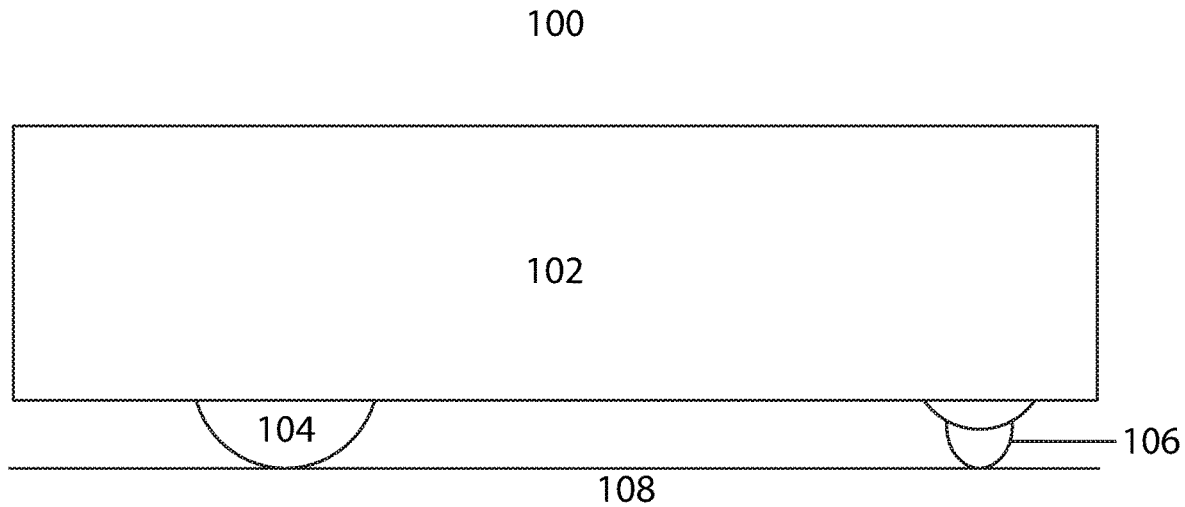
FIG. 1 illustrates a side view of a robotic floor-cleaning device embodying features of the present invention.

Referring to FIG. 1, a side view of a robotic floor-cleaning device 100 is illustrated. Robotic floor-cleaning device 100 is comprised of housing 102, driving wheels 104 (only one of two wheels can be seen), and steering wheel 106. The robotic floor-cleaning device is driving on work surface 108.

Figure 2:
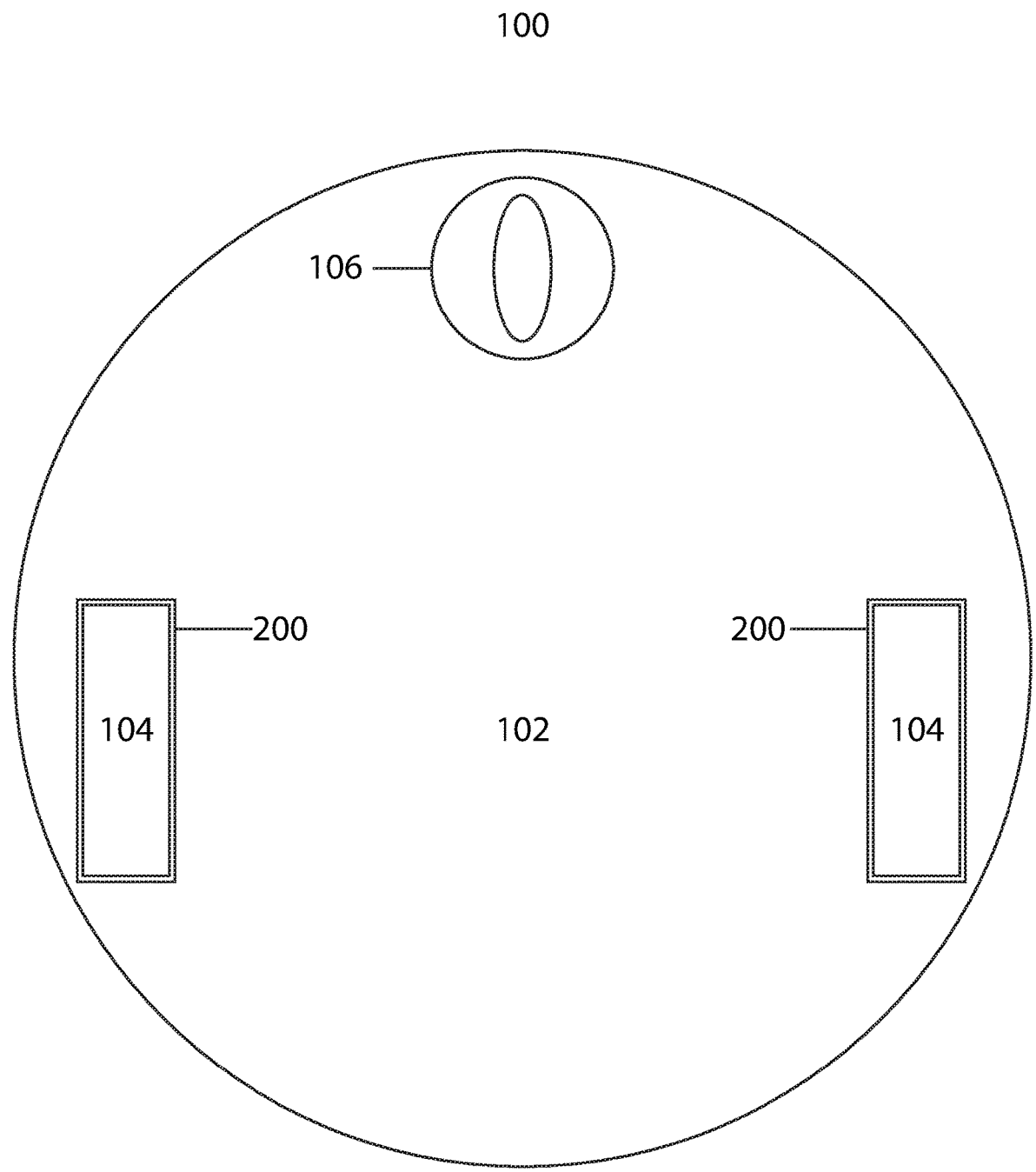
FIG. 2 illustrates a bottom view of a robotic floor-cleaning device embodying features of the present invention.

Referring to FIG. 2, a bottom view of robotic floor-cleaning device 100 is illustrated. Robotic floor-cleaning device 100 is comprised of housing 102, driving wheels 104, steering wheel 106, and wheel housings 200. Driving wheels 104 are retracted into the wheel housings 200 upon sensing entanglement with an obstruction. In the preferred embodiment, the wheel housings are substantially only capable of fitting a corresponding wheel within the housing such that obstructions are prevented from entering within the wheel housings due to a lack of space. It should be noted that robotic floor-cleaning devices with a different configuration and number/type of wheels may equally benefit from the proposed invention. The robotic floor-cleaning device shown is for illustrative purposes only and is not intended to be restrictive.

Figure 3:
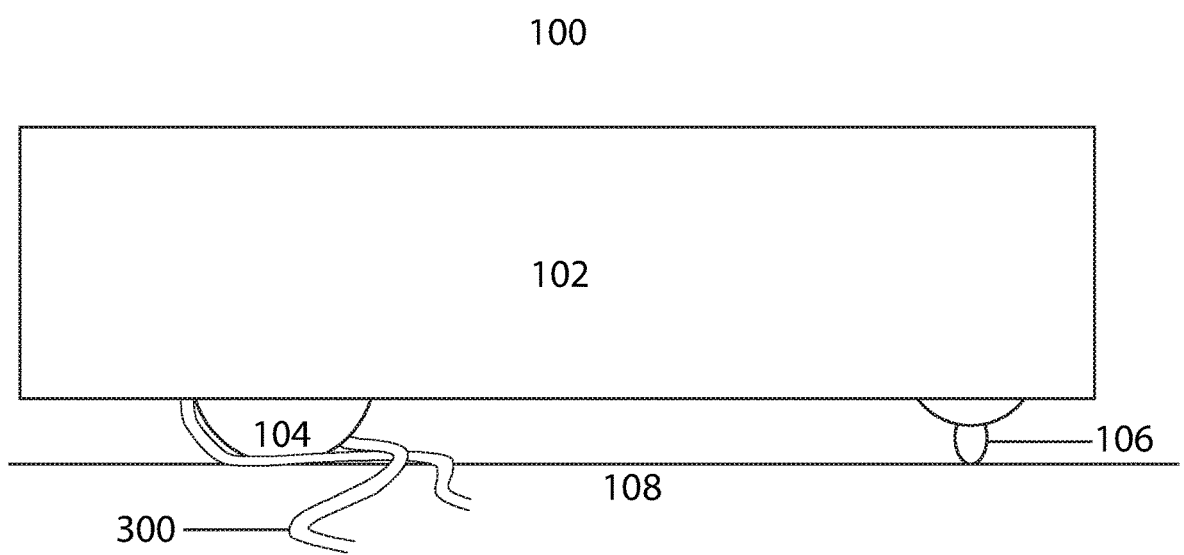
FIG. 3 illustrates a side view of a robotic floor-cleaning device becoming entangled with an electrical cord embodying features of the present invention.

Referring to FIG. 3, a side view of robotic floor-cleaning device 100 becoming entangled with cord 300 is illustrated. As before, robotic floor-cleaning device 100 includes housing 102, driving wheels 104 and steering wheel 106. Robotic floor-cleaning device 100 operates on work surface 108 during which it encounters loose cord 300, which then becomes entangled in wheel 104.

Figure 4A:
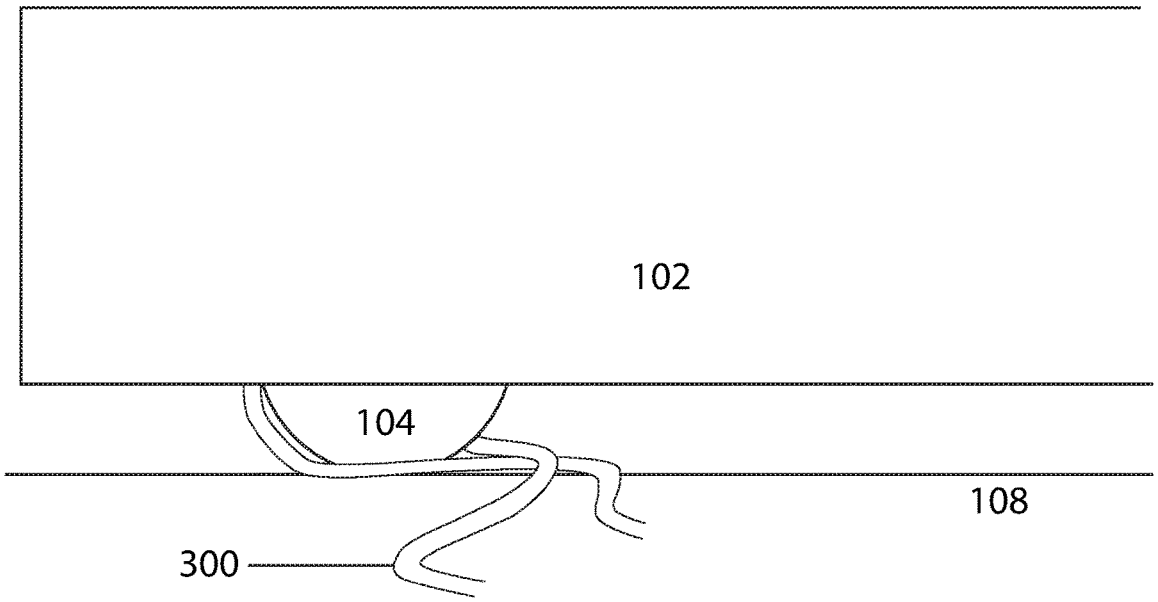
FIG. 4A illustrates a detailed side view of a robotic floor-cleaning device wheel entangled with an electrical cord embodying features of the present invention.
Figure 4B:
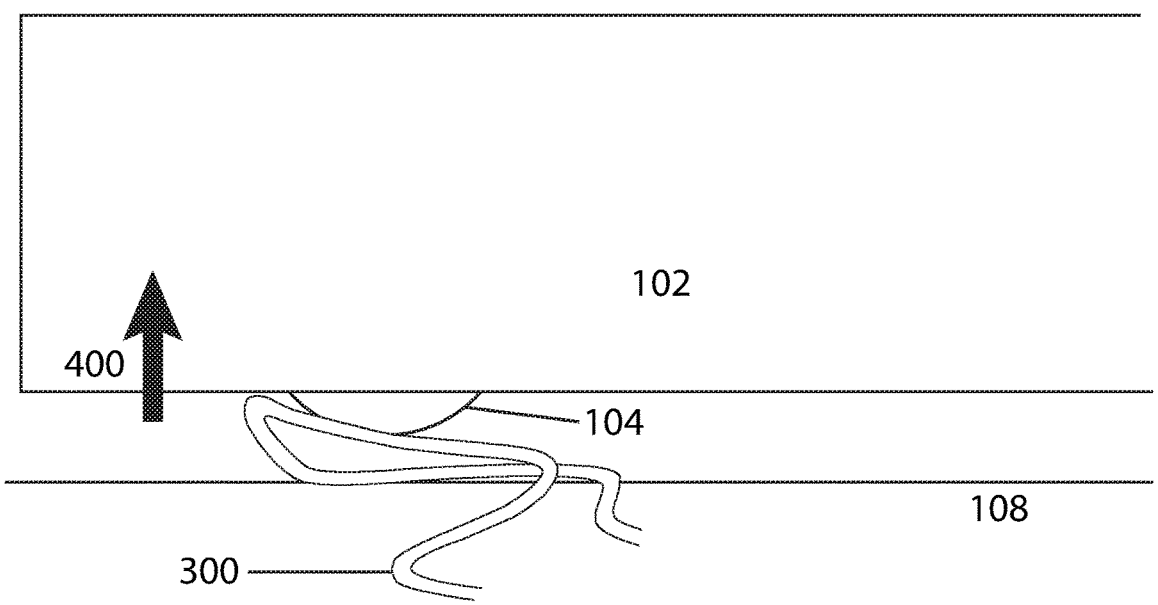
FIG. 4B illustrates a detailed side view of a robotic floor-cleaning device wheel being retracted to disentangle the wheel from an electrical cord embodying features of the present invention.

Referring to FIG. 4A, a side view of wheel 104 entangled with cord 300 is illustrated. Referring to FIG. 4B, a side view of wheel 104 being retracted is illustrated. Upon detecting the entanglement (cord 300), wheel 104 is programmed to retract by moving in upwards direction 400 into the corresponding wheel housing (not shown) located within robotic device housing 102 for a predetermined amount of time. As wheel 104 is retracted into the wheel housing, the entangled obstruction (cord 300) is forcibly separated from the wheel because the wheel housing is only large enough to accommodate the corresponding wheel. In this way, any obstructions on or around the retracted wheel are forcibly pushed off as the wheel enters the wheel housing thus freeing the wheel from the obstruction.

Figure 5A:
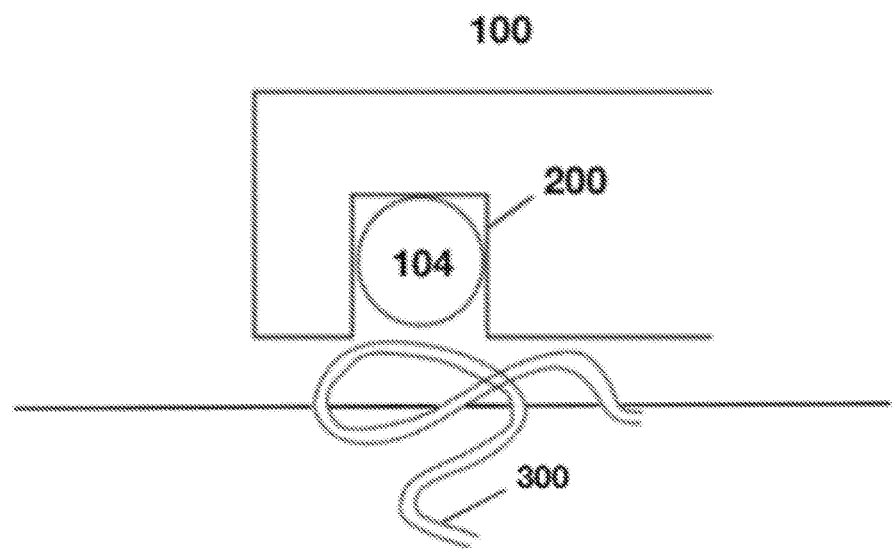
FIG. 5A illustrates a cross-sectional side view of a robotic floor-cleaning device wheel fully retracted and disentangled from an electrical cord embodying features of the present invention.
Figure 5B:
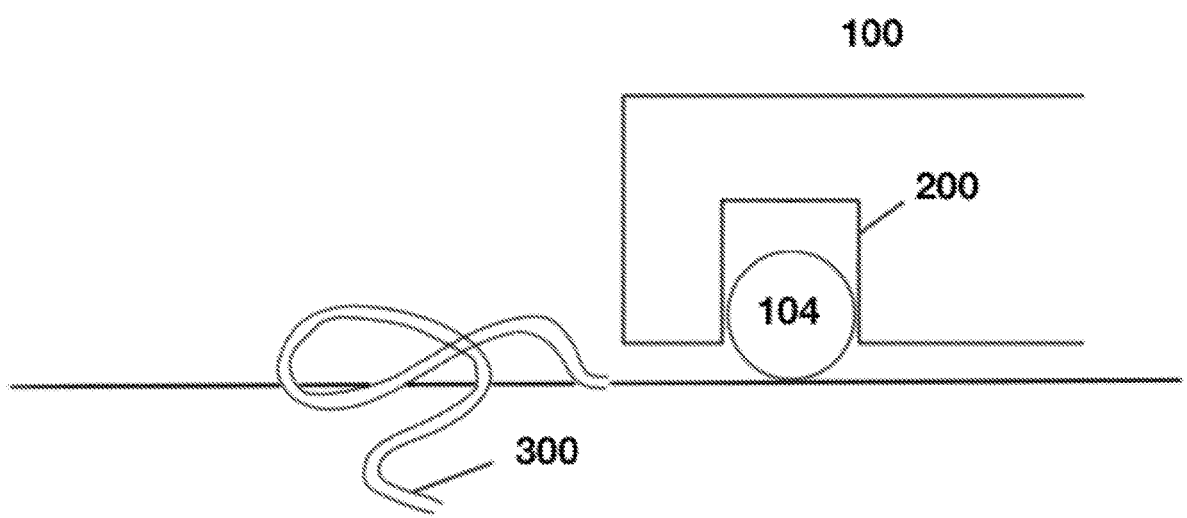
FIG. 5B illustrates a cross-sectional side view of a robotic floor-cleaning device wheel released after retraction and resuming normal operation.

Referring to FIG. 5A, a cross-sectional side view of robotic floor-cleaning device 100 is illustrated such that fully retracted wheel 104 within wheel housing 200 can be seen. Cord 300 has been forcibly separated from the wheel during retraction. Referring to FIG. 5B, a cross-sectional side view of robotic floor-cleaning device 100 is illustrated after disentanglement with the obstruction (cord 300). After retraction for a predetermined amount of time, wheel 104 is released from housing 200 and normal operation is resumed.

Various methods may be employed to actuate wheel retraction. Some possible methods will now be presented, however, it should be understood that any available method for sensing an obstruction may be employed without limitation. The examples provided herein are for illustrative purposes only and are not intended to restrict the invention.

In some embodiments, an odometer can be used to monitor wheel rotation for the purpose of detecting a wheel obstruction. When wheel rotations are fewer than normal, something may be preventing a wheel from turning normally. If the number of wheel rotations over a predetermined amount of time is less than a predetermined amount, this may indicate that a wheel is obstructed and wheel retraction can be actuated. A robotic floor-cleaning device can have a separate odometer for each wheel, allowing the system to identify which wheels to retract, or the device can simply retract all driving wheels when the number of wheel rotations counted by the odometer are less than a predetermined amount.

In some embodiments, the current that is drawn by a wheel can be monitored to determine when a wheel should be retracted. Since a higher current corresponds to a wheel supporting a larger load, this can be used to indicate when a wheel is obstructed. When a wheel is obstructed, the wheel supports a larger load and the wheel draws a larger current to rotate. In this way, a current threshold can be defined such that if the current drawn by a wheel surpasses the threshold, a wheel obstruction is identified and wheel retraction is actuated. A separate wheel motor can be used for each wheel and the amount of current utilized by the separate wheel motors can be monitored, which would allow the robotic floor-cleaning device to identify which wheels are obstructed and thus which wheels to retract.

In some embodiments, computer vision and deep learning may be used to identify objects that are likely to become entangled in the wheels of a robotic floor-cleaning device. A catalogue of various objects is preloaded into a database stored in a memory unit. Characteristics of the various objects are extracted using computer vision technology. Images of the work environment are iteratively captured and the characteristics of those images are extracted and compared to the objects in the database. Using this method, electrical cords, cables and wires are identified. If a match or potential match is found, the threshold requirements for actuating wheel retraction are lowered. For example, a current threshold may be lowered upon identifying an object in the robotic floor-cleaning device path that matches at least a predetermined percent of the characteristics of one of the objects in the database. Or, the threshold for number of wheel rotations within a predetermined time period may be lowered. This means that when the robotic floor-cleaning device approaches an obstacle that might be an electrical cord or wire, its wheels will be retracted sooner than if the obstacle was not detected beforehand. Lowering the threshold requirements for actuating wheel retraction without this condition would lead to too many false positives, however, the added step of object recognition lowers the likelihood of wrongly identifying objects as items likely to become entangled, which would result in unnecessary wheel retractions.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

I claim:

1. A method for automatically removing obstructions from a robotic floor-cleaning device wheel comprising:

defining one or more sets of conditions to actuate retraction of one or more wheels of the robotic floor-cleaning device into a corresponding wheel housing positioned within a main housing of the robotic floor-cleaning device;

interrupting a robotic floor-cleaning process upon satisfaction of the one or more sets of conditions for a predetermined amount of time;

retracting the one or more wheels into said corresponding wheel housing;

releasing the one or more wheels from said wheel housing after the predetermined amount of time; and proceeding with the robotic floor-cleaning process, wherein the wheel housing is designed with minimal amount of clearance between the wheel and adjacent wheel housing walls such that no other objects except a corresponding wheel may fit within the wheel housing during retraction and obstructions are forcibly pushed off and separated from the one or more wheels of the robotic floor-cleaning device by the wheel housing during retraction.

2. The method of claim 1 wherein a set of conditions for actuating retraction of one or more wheels includes any of: a number of wheel rotations over a predetermined length of time falling below a predetermined threshold, and a current measurement drawn by a wheel exceeding a predetermined threshold.

3. The method of claim 2, wherein at least one odometer is used to monitor wheel rotations over time.

4. The method of claim 3, wherein a unique odometer is used to monitor each wheel and wheels are retracted individually when a corresponding odometer detects that wheel rotations over the predetermined length of time have fallen below the threshold.

5. The method of claim 2 wherein a separate wheel motor powers each wheel and the amount of current drawn by the separate wheel motors is monitored, and wheels are retracted individually when a corresponding motor detects that a current measurement drawn by a wheel exceeds the threshold.

6. The method of claim 1, further comprising using computer vision and deep learning to identify objects likely to obstruct wheels and determine when to actuate wheel retraction.

7. The method of claim 6, further comprising:

preloading a catalogue of objects likely to obstruct wheels into a database stored in a memory unit of the robotic floor-cleaning device;

extracting characteristics of the objects likely to obstruct wheels using computer vision;

iteratively capturing images of a work environment with an image sensor;

extracting characteristics of said images;

comparing the characteristics of said images to the characteristics of the objects in the catalogue; and, determining that an object likely to obstruct wheels is present if more than a predetermined percentage of characteristics in an image match with characteristics of an object in the catalogue.

8. The method of claim 7, further comprising actuating retraction of one or more wheels of the robotic floor-cleaning device when it has been determined that an object likely to obstruct wheels is present.

9. The method of claim 7, wherein a set of conditions for actuating retraction of one or more wheels includes any of: a number of wheel rotations over a predetermined length of time falling below a first predetermined threshold, and a current measurement drawn by a wheel exceeding a second predetermined threshold and wherein, upon determining that an object likely to obstruct wheels is present, increasing the first predetermined threshold and decreasing the second predetermined threshold.

10. A robotic floor-cleaning device comprising:

a chassis including a set of wheels;

a wheel housing disposed within the chassis and over each wheel into which each wheel may be retracted, the wheel housing is designed with a minimal amount of clearance between the wheel and adjacent wheel housing walls such that no other objects except a corresponding wheel may fit within the wheel housing during retraction of the wheel;

at least one motor to drive the wheels;

a method for detecting obstructions on wheels;

a battery to provide power to the robotic floor-cleaning device; and, a controller in communication with the motor and wheels, the controller including a processor operable to control the motor and wheels to steer movement of the robotic device and actuate retraction and release of the wheels;

wherein upon detection of an obstruction on a wheel, the wheel is retracted into the wheel housing and any obstructions thereon are forcibly separated from and pushed off of the wheel by the wheel housing.

11. The robotic floor-cleaning device of claim 10 wherein the method for detecting obstructions on wheels includes any of: counting a number of wheel rotations over a predetermined length of time compared to a predetermined minimum; and, measuring a current drawn by a wheel compared to a predetermined maximum, wherein an obstruction is detected on a wheel if the number of wheel rotations over a predetermined length of time is less than the predetermined minimum, or if the current drawn by a wheel is greater than the predetermined maximum.

12. The robotic floor-cleaning device of claim 11 wherein at least one odometer is used to count wheel rotations.

13. The robotic floor-cleaning device of claim 11 wherein a unique odometer is used to count wheel rotations of each wheel and wheels are retracted individually when a corresponding odometer detects that wheel rotations over the predetermined length of time are below the predetermined minimum.

14. The robotic floor-cleaning device of claim 11 wherein unique wheel motors power each wheel and the amount of current drawn by the unique wheel motors is monitored, and wheels are retracted individually when a corresponding wheel motor detects that a current drawn by a wheel exceeds the predetermined maximum.

15. The robotic floor-cleaning device of claim 10 further comprising:

a catalogue of images of objects likely to obstruct wheels stored in a memory unit;

an image sensor for capturing images of an environment of the robotic floor-cleaning device; and, an image processing unit for extracting a first set of characteristics of the images of objects in the catalogue, extracting a second set of characteristics of captured images, comparing the second set of characteristics to the first set of characteristics, and determining that an object likely to obstruct wheels is present in the environment if more than a predetermined percentage of characteristics in the first and second set match.

16. The robotic floor-cleaning device of claim 15 wherein retraction of one or more wheels of the robotic floor-cleaning device is actuated when it has been determined that an object likely to obstruct wheels is present.

17. The robotic floor-cleaning device of claim 15 wherein the method for detecting obstructions on wheels includes any of: counting a number of wheel rotations over a predetermined length of time compared to a predetermined minimum; and, measuring a current drawn by a wheel compared to a predetermined maximum, wherein an obstruction is detected on a wheel if the number of wheel rotations over a predetermined length of time is less than the predetermined minimum, or if the current drawn by a wheel is greater than the predetermined maximum, and wherein, if it is determined that an object likely to obstruct wheels is present in the environment, the predetermined minimum is increased and the predetermined maximum is decreased.

18. A method for removing obstructions from a robotic floor-cleaning device comprising:
    defining one or more sets of conditions to actuate retraction of one or more wheels of the robotic floor-cleaning device into a corresponding wheel housing positioned within a main housing of the robotic floor-cleaning device;
    retracting one or more wheels into said corresponding wheel housing upon satisfaction of the one or more sets of conditions for a predetermined amount of time;
    returning the one or more wheels to a standard position after the predetermined amount of time; and
    proceeding with a robotic floor-cleaning process as normal;
    wherein the wheel housing is designed with minimal amount of clearance between the wheel and adjacent wheel housing walls such that substantially no other objects except a corresponding wheel may fit within the wheel housing during retraction and obstructions are forcibly pushed off and separated from the one or more wheels of the robotic floor-cleaning device by the wheel housing during retraction.

19. The method of claim 18 wherein a set of conditions for actuating retraction of one or more wheels includes any of: a number of wheel rotations over a predetermined length of time falling below a predetermined threshold, and a current measurement drawn by a wheel exceeding a predetermined threshold.

20. The method of claim 18, further comprising:
    preloading a catalogue of objects likely to obstruct wheels into a database stored in a memory unit of the robotic floor-cleaning device;
    extracting characteristics of the objects likely to obstruct wheels using an image processor;
    iteratively capturing images of a work environment with an image sensor;
    extracting characteristics of said images with the image processor;
    comparing the characteristics of said images to the characteristics of the objects in the catalogue;
    determining that an object likely to obstruct wheels is present if more than a predetermined percentage of characteristics in an image match with characteristics of an object in the catalogue; and,
    actuating retraction of one or more wheels of the robotic floor-cleaning device if it is determined that an object likely to obstruct wheels is present.

* * * * *